United States Patent
Hong

(10) Patent No.: US 11,514,801 B2
(45) Date of Patent: Nov. 29, 2022

(54) FLIGHT CONTROL METHOD, DEVICE AND SYSTEM

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 341 days.

(21) Appl. No.: 16/641,644

(22) PCT Filed: Aug. 28, 2017

(86) PCT No.: PCT/CN2017/099358
§ 371 (c)(1),
(2) Date: Feb. 24, 2020

(87) PCT Pub. No.: WO2019/041110
PCT Pub. Date: Mar. 7, 2019

(65) Prior Publication Data
US 2021/0166569 A1 Jun. 3, 2021

(51) Int. Cl.
*G08G 5/00* (2006.01)
*H04W 76/11* (2018.01)
(Continued)

(52) U.S. Cl.
CPC ........... *G08G 5/006* (2013.01); *G08G 5/0013* (2013.01); *G08G 5/0026* (2013.01);
(Continued)

(58) Field of Classification Search
CPC .... G08G 5/006; G08G 5/0013; G08G 5/0026; G08G 5/0069; H04W 76/11; H04W 76/27; H04W 80/02
(Continued)

(56) References Cited

U.S. PATENT DOCUMENTS 9,087,451 B1 * 7/2015 Jarrell .................... G05D 1/101
9,317,036 B2 4/2016 Wang et al.
(Continued)

FOREIGN PATENT DOCUMENTS

| CN | 101449177 A | 6/2009 |
| CN | 104570872 A | 4/2015 |

(Continued)

OTHER PUBLICATIONS

The International Search and English translation to PCT Application No. PCT/CN2017/099358, dated May 9, 2017, (5p).
(Continued)

*Primary Examiner* — Isaac G Smith
(74) *Attorney, Agent, or Firm* — Arch & Lake LLP

(57) ABSTRACT

A flight control method, device and system are provided. The method includes: sending a first message to a base station, wherein the first message is a message for requesting a radio resource control (RRC) connection, and the first message carries an aircraft identifier; receiving a second message sent by the base station, wherein the second message is a message for notifying the aircraft that the RRC connection is successful, and the second message carries a no-fly zone range; and performing a stop-flight operation when the position of the aircraft is within the no-fly zone range.

20 Claims, 10 Drawing Sheets

Sending a Message 3 to a base station, which is a message for requesting a radio resource control (RRC) connection, and carries an aircraft identifier — 101

Receiving a Message4 sent by the base station, which is a message for notifying the aircraft that the RRC connection is successful, and carries a no-fly zone range — 102

Performing a stop-flight operation when the position of the aircraft is within the no-fly zone range — 103

(51) Int. Cl.
*H04W 76/27* (2018.01)
*H04W 80/02* (2009.01)
*H04W 84/06* (2009.01)

(52) U.S. Cl.
CPC .......... *G08G 5/0069* (2013.01); *H04W 76/11* (2018.02); *H04W 76/27* (2018.02); *H04W 80/02* (2013.01); *H04W 84/06* (2013.01)

(58) Field of Classification Search
USPC .............................................................. 701/3
See application file for complete search history.

(56) References Cited

U.S. PATENT DOCUMENTS

| | | | |
|---|---|---|---|
| 9,483,950 | B1 | 11/2016 | Wang et al. |
| 9,618,934 | B2 | 4/2017 | Deroos et al. |
| 9,704,408 | B2 | 7/2017 | Yu et al. |
| 9,842,505 | B2 | 12/2017 | Wang et al. |
| 2006/0167599 | A1 | 7/2006 | Bodin et al. |
| 2009/0030566 | A1 | 1/2009 | Bodin et al. |
| 2015/0181544 | A1* | 6/2015 | Liu ................ H04B 7/18506 370/336 |
| 2015/0254988 | A1* | 9/2015 | Wang ................ B64D 47/08 701/3 |
| 2015/0339931 | A1 | 11/2015 | Yu et al. |
| 2015/0340759 | A1 | 11/2015 | Bridgelall et al. |
| 2016/0321930 | A9 | 11/2016 | Yu et al. |
| 2016/0321931 | A9 | 11/2016 | Wang et al. |
| 2017/0257842 | A1* | 9/2017 | Hessler ............ H04W 68/005 |
| 2017/0301242 | A1 | 10/2017 | Yu et al. |
| 2017/0372618 | A1 | 12/2017 | Xu et al. |
| 2018/0152870 | A1* | 5/2018 | Park ................ B64C 39/024 |
| 2019/0180633 | A1* | 6/2019 | Yoshizawa ........... G08G 5/0013 |

FOREIGN PATENT DOCUMENTS

| | | |
|---|---|---|
| CN | 104950907 A | 9/2015 |
| CN | 105206116 A | 12/2015 |
| CN | 105225540 A | 1/2016 |
| CN | 105247593 A | 1/2016 |
| CN | 105280026 A | 1/2016 |
| CN | 105357220 A | 2/2016 |
| CN | 105608930 A | 5/2016 |
| CN | 105608931 A | 5/2016 |
| CN | 105761550 A | 7/2016 |
| CN | 105992320 A | 10/2016 |
| CN | 106444833 A | 2/2017 |
| CN | 106664511 A | 5/2017 |
| CN | 106717105 A | 5/2017 |
| CN | 106970640 A | 7/2017 |
| WO | 2016062421 A1 | 4/2016 |
| WO | 2016125161 A1 | 8/2016 |

OTHER PUBLICATIONS

First office action of Chinese application No. 201780000912.0 dated Jul. 31, 2020.
Notification to grant patent right for invention of Chinese Application No. 201780000912.0 dated Apr. 6, 2021, (8p).

* cited by examiner

FLIGHT CONTROL METHOD, DEVICE AND SYSTEM

CROSS-REFERENCE TO RELATED APPLICATION

This application is a national phase application based on PCT/CN2017/099358, filed on Aug. 28, 2017, the content of which is incorporated herein by reference.

TECHNICAL FIELD

The present disclosure relates to the field of wireless communications, and more particularly to a flight control method, device and system.

BACKGROUND

With the development of drone technology, the drone's flight duration, flight distance, flight altitude, etc. have been greatly improved. Users can intelligently operate the drone through the drone controller, such as instruct the drone to fly in accordance with designated routes, hover in the air, etc. The application fields of drones become more and more extensive. For civilian drones, camera equipment may be installed on the drone, and then the drone may be used for aerial photography.

In recent years, the number of civilian drones has increased, and the use of civilian drones has become more standardized. Specifically, the airspace within a certain range of airports or areas with high confidentiality may be divided into no-fly zones for civilian drones, and civil aircrafts are prohibited from all flight activities in the no-fly zone.

SUMMARY

The present disclosure provides a flight control method, device and system. The technical solutions are as follows.

According to a first aspect of the embodiments of the present disclosure, there is provided a flight control method, the method including:

sending a Message3 to a base station, wherein the Message3 is a message for requesting a radio resource control (RRC) connection, and the Message3 carries an aircraft identifier;

receiving a Message4 sent by the base station, wherein the Message4 is a message for notifying the aircraft that the RRC connection is successful, and the Message4 carries a no-fly zone range; and performing a stop-flight operation when determining that the position of the aircraft is within the no-fly zone range.

According to a second aspect of the embodiments of the present disclosure, there is provided a flight control method, the method including:

receiving a Message3 sent by an aircraft, wherein the Message3 is a message for requesting a radio resource control (RRC) connection, and the Message3 carries an aircraft identifier;

acquiring a no-fly zone range corresponding to the base station in response to available resources of the base station meeting a transmission condition of the RRC connection requested by the Message3 and the Message3 carries the aircraft identifier; and sending a Message4 to the aircraft, wherein the Message4 carries the no-fly zone range and is used to notify the aircraft that the RRC connection is successful.

According to a third aspect of the embodiments of the present disclosure, there is provided a flight control device, wherein the device is an aircraft, the device including:

a processor; and a memory configured to store an instruction executable by the processor, wherein the processor is configured to:

send a Message3 to a base station, wherein the Message3 is a message for requesting a radio resource control (RRC) connection, and the Message3 carries an aircraft identifier;

receive a Message4 sent by the base station, wherein the Message4 is a message for notifying the aircraft that the RRC connection is successful, and the Message4 carries a no-fly zone range; and perform a stop-flight operation when determining that the position of the aircraft is within the no-fly zone range.

It is to be understood that both the foregoing general description and the following detailed description are exemplary and explanatory only and are not intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

An exemplary embodiment of the present disclosure provides a flight control method that may be implemented by an aircraft, which may be a drone.

The aircraft may include a processor, a memory, a transceiver, a flight component, and the like. The processor may be a CPU (Central Processing Unit) or the like, and can be used to control flight components to perform flight related processing. The memory may be RAM (Random Access Memory), Flash (Flash), etc., and can be used to store received data, data required for processing, data generated during processing, etc., such as no-fly zone information. RRC (Radio Resource Control) connection request, RRC connection success notification, and the like. The transceiver can be used for data transmission with the base station, for example, sending Message3 to the base station, receiving Message4 sent by the base station, etc. The transceiver may include an antenna, a matching circuit, a modem, and the like. The flying components may include an electric motor, a propeller, etc. The electric motor is used to provide power for the flight of the aircraft. The propeller is used to propel the air flow to achieve flight.

Figure 1:
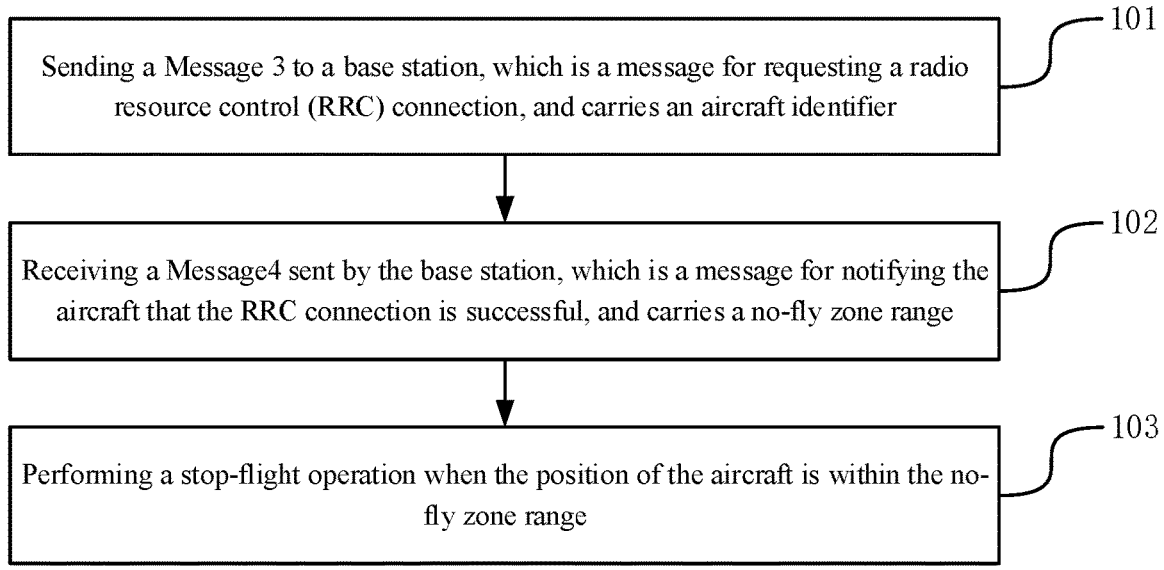
FIG. 1 is a flowchart of a flight control method according to an exemplary embodiment.

As shown in FIG. 1, the processing flow of the method may include the following steps.

In step 101, a Message3 is sent to a base station. The Message3 is a message for requesting a radio resource control (RRC) connection, and the Message3 carries an aircraft identifier.

In step 102, a Message4 sent by the base station is received. The Message4 is a message for notifying the aircraft that the RRC connection is successful, and the Message4 carries a no-fly zone range.

In step 103, a stop-flight operation is performed when the position of the aircraft is within the no-fly zone range.

In this way, after an RRC connection is established between the aircraft and the base station, a no-fly zone range corresponding to the base station can be obtained, and further, whether the aircraft is within the no-fly zone range can be automatically determined, without subjective judgment by the person, thereby the accuracy of determining the no-fly zone range is improved.

An exemplary embodiment of the present disclosure provides a flight control method that may be implemented by a base station.

The base station may include components such as a processor, a memory, a transceiver, and the like. The processor may be a CPU or the like, and can be used to acquire a no-fly zone range corresponding to the base station, and determine that a terminal that sends the Message3 is an aircraft. The memory, which may be RAM, Flash, etc., can be used to store received data, data required for processing, data generated during processing, such as no-fly zone information, Message3, Message4, and the like. The transceiver can be used for data transmission with the aircraft, for example, receiving Message3 sent by the aircraft, sending Message4 to the aircraft, etc. The transceiver may include an antenna, a matching circuit, a modem, and the like.

Figure 2:
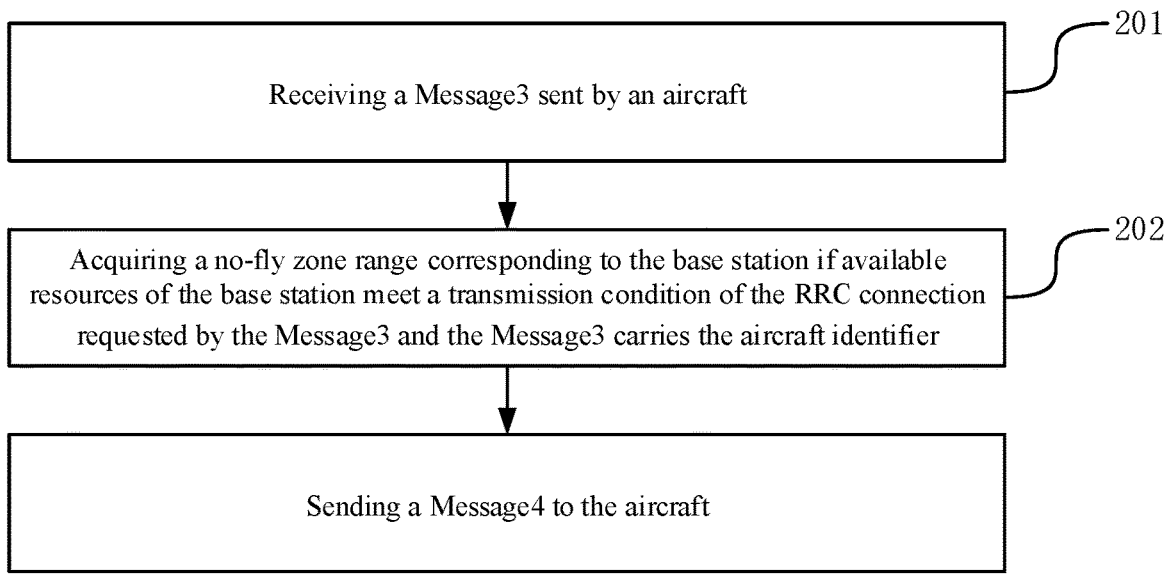
FIG. 2 is a flowchart of a flight control method according to an exemplary embodiment.

As shown in FIG. 2, the processing flow of the method may include the following steps.

In step 201, a Message3 sent by an aircraft is received.

The Message3 is a message for requesting a radio resource control (RRC) connection, and the Message3 carries an aircraft identifier. For example, Message3 may be referred to as a first message.

In step 202, a no-fly zone range corresponding to the base station is acquired in response to available resources of the base station meeting a transmission condition of the RRC connection requested by the Message3 and the Message3 carries the aircraft identifier.

In step 203, a Message4 is sent to the aircraft.

The Message4 is a message for notifying the aircraft that the RRC connection is successful, and the Message4 carries the no-fly zone range. For example, Message4 may be referred to as a second message.

In this way, after an RRC connection is established between the aircraft and the base station, the base station can send a corresponding no-fly zone range to the aircraft, and further, the aircraft can automatically determine whether it is within the no-fly zone range based on the received no-fly zone range, without subjective judgment of the person, thereby the accuracy of determining the no-fly zone range is improved.

Another exemplary embodiment of the present disclosure provides a flight control method that may be implemented by an aircraft in conjunction with a base station. The hardware structures of the aircraft and the base station may be referred to the content of the foregoing embodiments.

Figure 3:
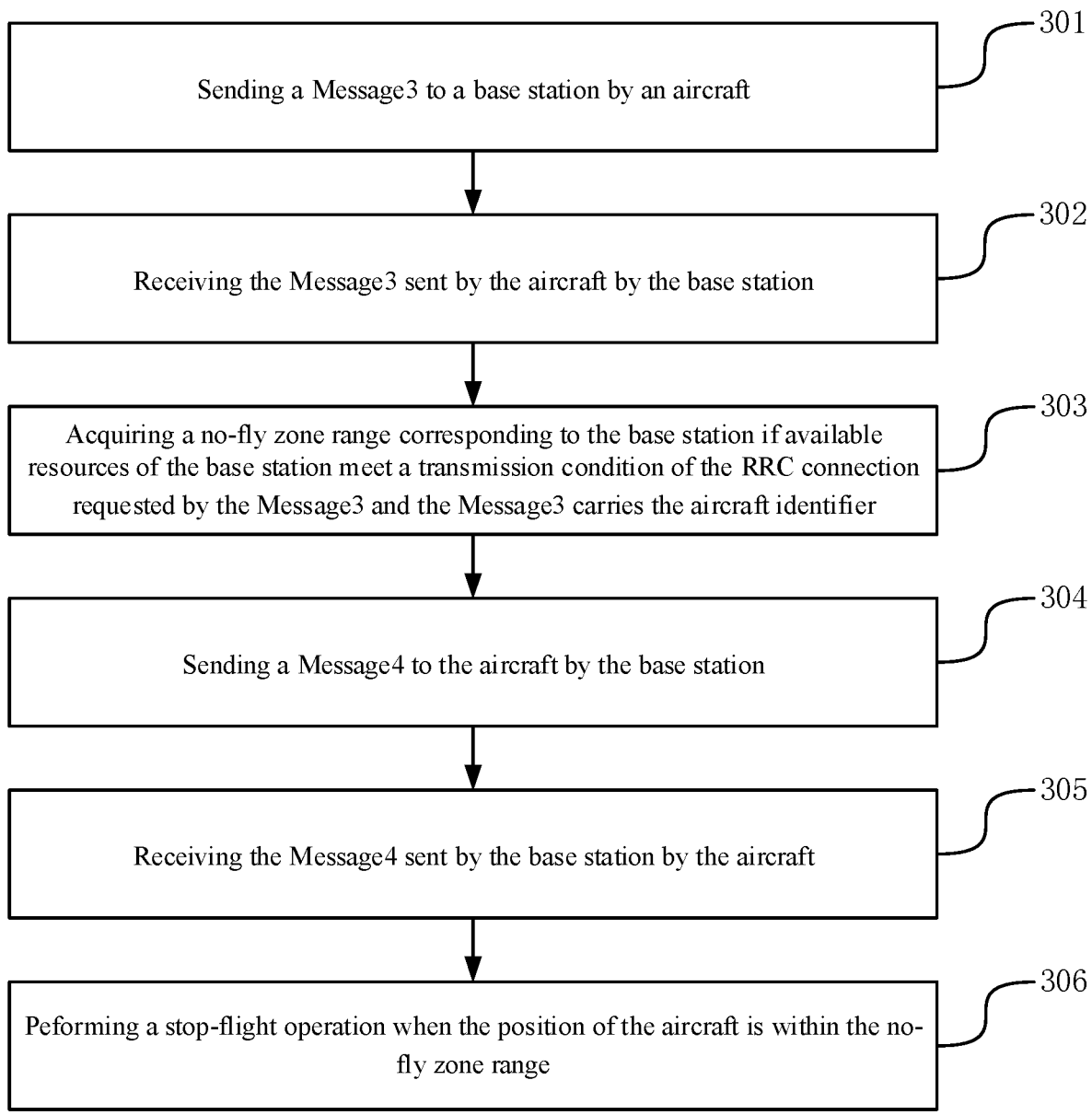
FIG. 3 is a flowchart of a flight control method according to an exemplary embodiment.

As shown in FIG. 3, the processing flow of the method may include the following steps.

In step 301, an aircraft sends a Message3 to a base station.

The Message3 may carry an aircraft identifier, and is used to notify the base station that a terminal that requests the RRC connection is an aircraft. The aircraft may be a cellular network drone. That is, the drone may transmit data over a cellular network. The Message3 is used to request a radio resource control (RRC) connection.

During implementation, after a user turns on the switch of the aircraft, or after the aircraft accesses a certain base station, when performing base station switchover during the flight, the aircraft may send a random access preamble to the base station requested for the connection. When the base station receives the random access preamble, an RAR (Random Access Response) message may be sent to the aircraft. When receiving the RAR message sent by the base station, the aircraft may send a Message3 to the base station. The Message3 may carry an aircraft identifier, and is used to notify the base station that a terminal requesting the RRC connected is an aircraft.

In step 302, the base station receives the Message3 sent by the aircraft.

In step 303, a no-fly zone range corresponding to the base station is acquired in response to available resources of the base station meeting a transmission condition of the RRC connection requested by the Message3 and the Message3 carries the aircraft identifier.

The Message3 may carry a service type. The no-fly zone range may be a range represented by latitude and longitude coordinates, which is used to indicate the range of areas where the aircraft is prohibited from performing all flight activities. The no-fly zone range corresponding to the base station may be an area that overlaps with the no-fly zone range within the service area of the base station, or may be a complete range of one or more no-fly zones that overlap with the service area of the base station.

During implementation, the technician may set the no-fly zone range on a no-fly zone management server, and send a no-fly zone range corresponding to each base station to the base station through the no-fly zone management server. After receiving the corresponding no-fly zone range, the base station stores the no-fly zone range. After receiving the Message3 sent by the aircraft, the base station may acquire the aircraft identifier from the Message3. That is, it may be known that a terminal requesting the RRC connection is an aircraft. At the same time, the base station may further determine, according to the service type requested in the Message3 and the current available resources of the base station, whether the available resources of the base station meet a transmission condition of the RRC connection requested in the Message3. If the available resources of the base station meet the transmission condition of the RRC connection, a no-fly zone range corresponding to the base station may be acquired and sent to the aircraft for indicating the area range in which the aircraft is prohibited from performing all flight activities.

In step 304, the base station sends a Message4 to the aircraft.

The Message4 is a message for notifying the aircraft that the RRC connection is successful, and the Message4 carries the no-fly zone range.

During implementation, the base station may add its corresponding no-fly zone range to the Message4, and further, may send the Message4 to the terminal.

Optionally, the no-fly zone range may be carried in an RRC Connection Setup signaling in the Message4.

The RRC Connection Setup signaling is a signaling for transmitting an RRC connection setup parameter. The no-fly zone range may be added in an extension field of the RRC Connection Setup signaling.

In step 305, the aircraft receives the Message4 sent by the base station.

During implementation, the aircraft receives the Message4 sent by the base station and carrying the no-fly zone range, and then stores the no-fly zone range for subsequent use.

In step 306, a stop-flight operation is performed when the position of the aircraft is within the no-fly zone range.

During implementation, the aircraft may acquire the current position by a positioning system (such as GPS, Beidou positioning system, etc.), which may be a position represented by latitude and longitude coordinates. Further, based on the current position and the stored no-fly zone range, whether the current position of the aircraft is within the no-fly zone range may be determined. When it is determined that the position of the aircraft is within the no-fly zone range, the aircraft may perform a stop-flight operation.

Figure 4:
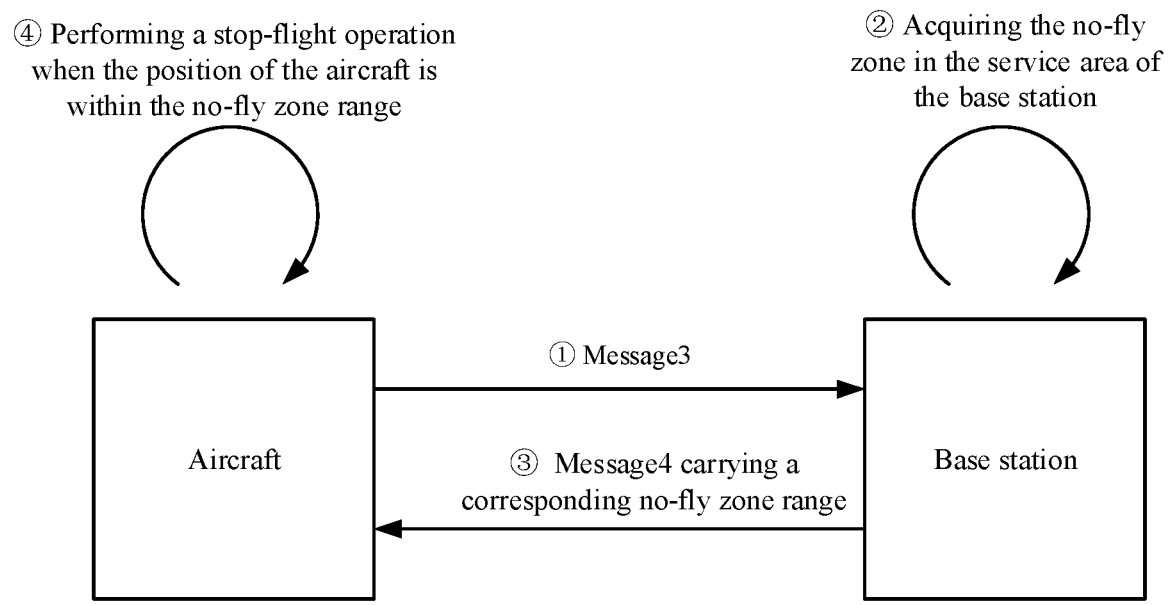
FIG. 4 is a system architecture diagram of a flight control method according to an exemplary embodiment.

The system framework of the embodiment of the present disclosure and the execution flow based on the system framework may be as shown in FIG. 4.

Alternatively, the stop-flight operation may be to land or prohibit takeoff. The corresponding processing may be as follows: landing if the aircraft is in a flight state; prohibiting takeoff if the aircraft is in a landed state.

Figure 5:
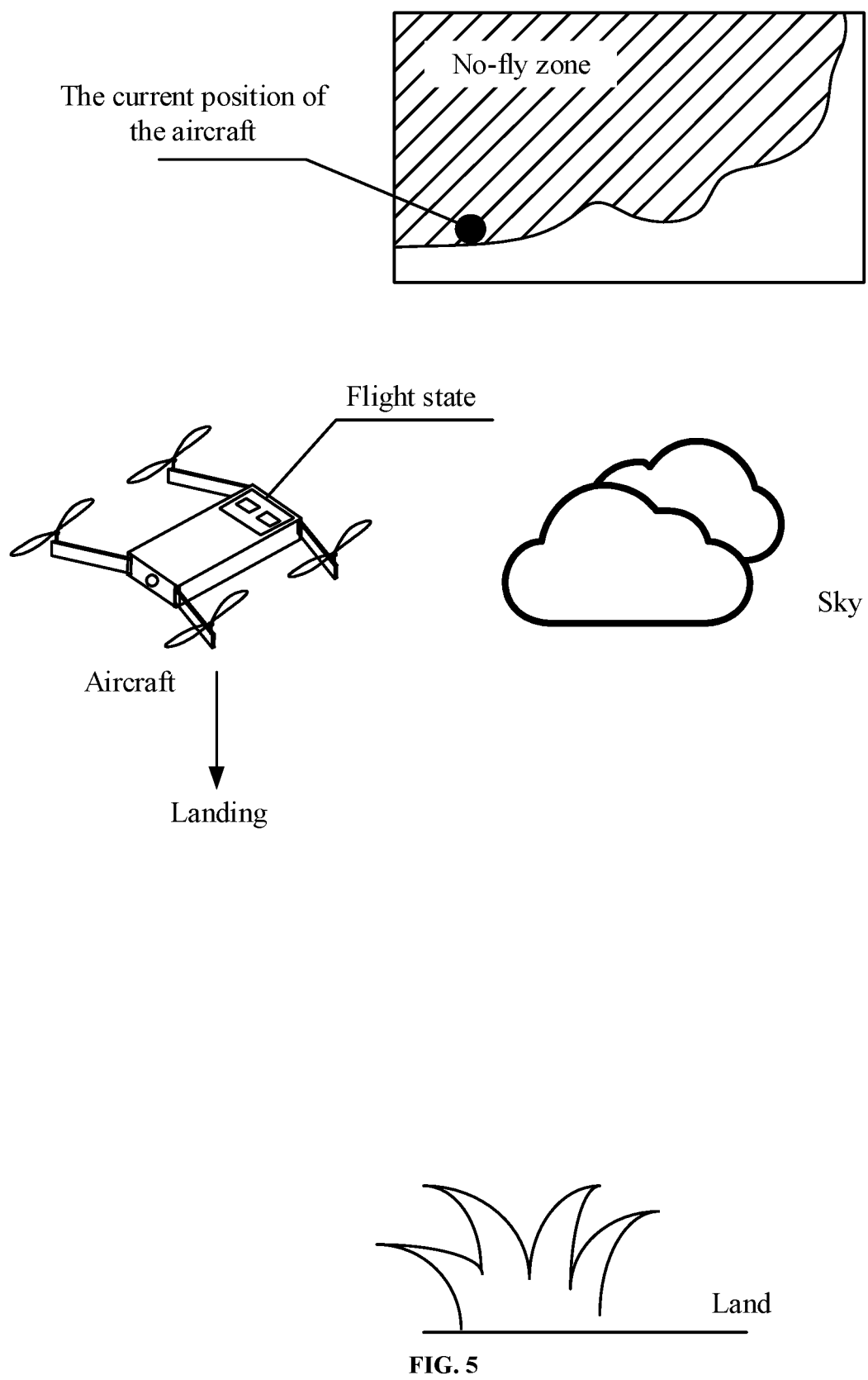
FIG. 5 is a schematic diagram of a scenario for performing a stop-flight operation according to an exemplary embodiment.
Figure 6:
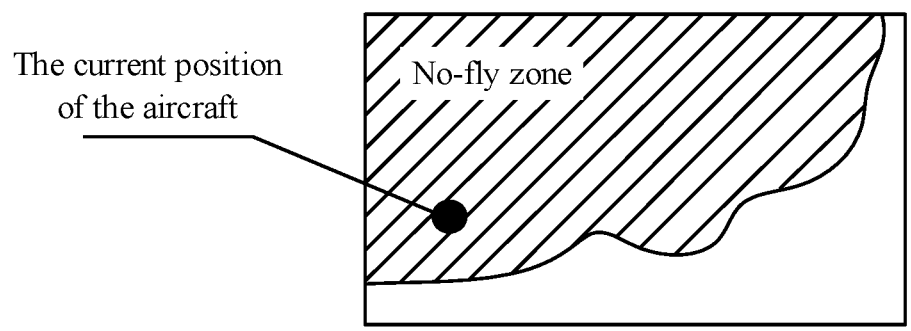
FIG. 6 is a schematic diagram of a scenario for performing a stop-flight operation according to an exemplary embodiment.
Figure 6:
Figure 6:
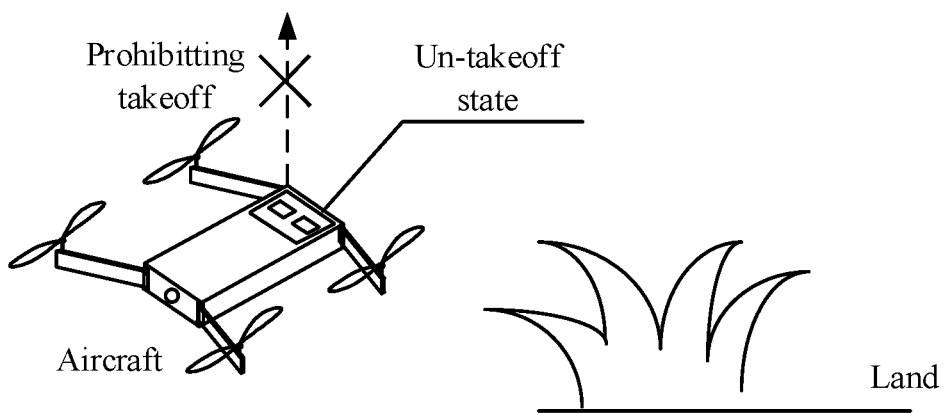

During implementation, as shown in FIG. 5, if the aircraft determines that the position of the aircraft is within the no-fly zone range based on the current position and the stored no-fly zone range during flight, that is, it is determined that the aircraft is in a flight state when the position of the aircraft is within the no-fly zone range, the aircraft may land immediately and no other operations can be performed. As shown in FIG. 6, if the aircraft is already in the no-fly zone before take-off, that is, it is determined that the aircraft is in a landed state when the position of the aircraft is within the no-fly zone range, the aircraft may not perform a take-off operation, that is, the aircraft is prohibited from taking off.

Optionally, the no-fly zone range may be updated. The corresponding processing on the base station side may be as follows: when the no-fly zone range is updated, an updated no-fly zone range is sent to an aircraft currently accessing the base station. The corresponding processing on the aircraft side may be as follows: receiving an updated no-fly zone range sent by the base station; and performing a stop-flight operation when the position of the aircrafts is within the updated no-fly zone range.

The aircraft currently accessing the base station may be an aircraft in a CONNECTED state, that is, the aircraft establishes an RRC connection with the base station.

During implementation, the technician may set the no-fly zone range on a no-fly zone management server, and send the no-fly zone range to each base station through the no-fly zone management server. After receiving the no-fly zone range, the base station stores the no-fly zone range. The technician may also update the no-fly zone range on the no-fly zone management server as needed, and send the updated no-fly zone range to each base station through the no-fly zone management server. When receiving the updated no-fly zone range, the base station may replace the local stored no-fly zone range with the updated no-fly zone range. Further, the base station may directly send the updated no-fly zone range to the aircraft currently accessing the base station.

Correspondingly, when the no-fly zone range is updated, the aircraft in a CONNECTED state with the base station may receive the updated no-fly zone range sent by the base station, and further, update the locally stored no-fly zone range to the currently received no-fly zone range. When the current position acquired by the aircraft is within the updated no-fly zone range, the aircraft may perform a stop-flight operation. The stop-flight operation has been introduced in the foregoing content of the embodiments, and details are not described herein again.

Optionally, the base station may send the updated no-fly zone range to the aircraft by using an RRC Connection Reconfiguration signaling or a MAC CE (Medium Access Control Control Element) signaling. The corresponding processing on the base station side may be as follows: sending an RRC Connection Reconfiguration signaling to the aircraft currently accessing the base station, the RRC Connection Reconfiguration signaling carrying the updated no-fly zone range; or sending a MAC CE signaling to the aircraft currently accessing the base station, the MAC CE signaling carrying the updated no-fly zone range. The corresponding processing on the aircraft side may be as follows: receiving the RRC Connection Reconfiguration signaling sent by the base station; or receiving the MAC CE signaling sent by the base station.

The RRC Connection Reconfiguration signaling is a signaling for sending an RRC Connection Reconfiguration parameter, and the MAC CE signaling is a signaling for sending control parameters (such as a cell radio network temporary identifier) in the RRC connection.

During implementation, when the current no-fly zone range is updated, the base station may add the updated no-fly zone range to the RRC Connection Reconfiguration signaling or the MAC CE signaling. The updated no-fly zone range may be added in the extension fields of the two signalings. And then, the RRC Connection Reconfiguration signaling or the MAC CE signaling may be sent to the aircraft currently accessing the base station to notify the aircraft of the updated no-fly zone range for subsequent processing.

Correspondingly, the aircraft may receive the RRC Connection Reconfiguration signaling or the MAC CE signaling carrying the updated no-fly zone range to acquire the updated no-fly zone range, and then update the locally stored no-fly zone range to the no-fly zone range currently received.

Optionally, the above describes how a base station notifies an aircraft in a CONNECTED state of the updated no-fly zone range. The following content describes how a base station notifies an aircraft in an IDLE state of the updated no-fly zone range. Correspondingly, the processing on the base station side may be as follows: when the no-fly zone range is updated, the base station may send a paging signaling to an aircraft that enters an IDLE state after accessing the base station.

The IDLE state may be an idle state in which the aircraft has no service processing after accessing the base station, and is opposite to the CONNECTED state.

During implementation, when the current no-fly zone range is updated, the base station may send a paging signaling to an aircraft in an IDLE state in the service area, so that the aircraft in an IDLE state re-accesses the base station to acquire the updated no-fly zone range. The aircraft paged in an IDLE state may be a designated aircraft, or may be all aircrafts in an IDLE state in the service area of the base station.

Correspondingly, after the aircraft in an IDLE state in the service area of the base station receives the paging signaling sent by the base station, the processing in steps 301-305 may be performed. At this moment, the no-fly zone range carried in the RRC Connection Setup signaling of the Message4 is the updated no-fly zone range, and the IDLE state of the aircraft changes to the CONNECTED state. The related processing of flight control in the CONNECTED state is consistent with the processing in the above method flow, and is not described herein again.

In the embodiment of the present disclosure, an aircraft sends a Message3 for requesting an RRC connection to a base station; after receiving the Message3 sent by the aircraft, the base station sends a Message4 carrying a corresponding no-fly zone range to the aircraft in response to available resources of the base station meeting a transmission condition of the RRC connection requested by the Message3 and the Message3 carries the aircraft identifier; and after receiving the Message4 carrying a no-fly zone range, the aircraft performs a stop-flight operation when the position of the aircraft is within the no-fly zone range. In this way, after an RRC connection is established between the aircraft and the base station, a no-fly zone range corresponding to the base station can be obtained, and then, whether the aircraft is within the no-fly zone range can be automatically determined, without subjective judgment by the person, thereby the accuracy of determining the no-fly zone range is improved.

Figure 7:
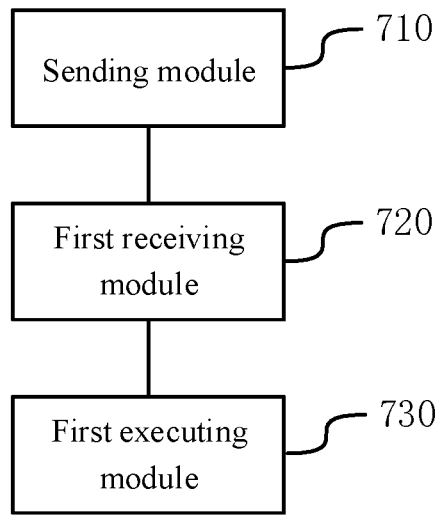
FIG. 7 is a schematic diagram of a flight control device according to an exemplary embodiment.

Yet another exemplary embodiment of the present disclosure provides a flight control device which may be an aircraft. As shown in FIG. 7, the device includes:

a sending module 710 configured to send a Message3 to a base station, wherein the Message3 is a message for requesting a radio resource control (RRC) connection, and the Message3 carries an aircraft identifier;

a first receiving module 720 configured to receive a Message4 sent by the base station, wherein the Message4 is a message for notifying the aircraft that the RRC connection is successful, and the Message4 carries a no-fly zone range; and a first executing module 730 configured to perform a stop-flight operation when the position of the aircraft is within the no-fly zone range.

Optionally, the Message4 carries an RRC Connection Setup signaling, and the RRC Connection Setup signaling carries the no-fly zone range.

Optionally, the executing module 730 is configured to:

land the aircraft in response to the aircraft being in a flight state; and prohibit takeoff of the aircraft in response to the aircraft being in a landed state.

Figure 8:
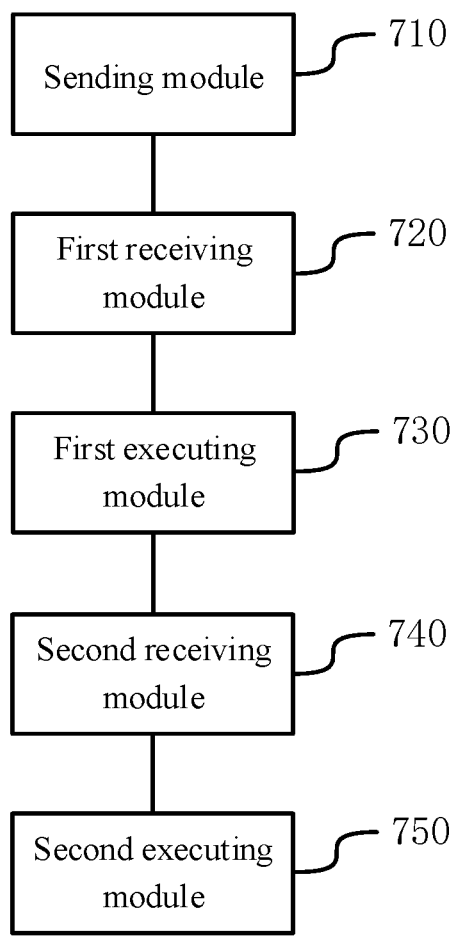
FIG. 8 is a schematic diagram of a flight control device according to an exemplary embodiment.

Optionally, as shown in FIG. 8, the device further includes:

a second receiving module 740 configured to receive an updated no-fly zone range sent by the base station; and a second executing module 750 configured to perform a stop-flight operation when the position of the aircraft is within the updated no-fly zone range.

Optionally, the second receiving module 750 is configured to:

receive an RRC Connection Reconfiguration signaling sent by the base station, wherein the RRC Connection Reconfiguration signaling carries the updated no-fly zone range; or receive a media access control control element (MAC CE) signaling sent by the base station, wherein the MAC CE signaling carries the updated no-fly zone range.

With regard to the device in the above embodiments, the specific manner in which the respective modules perform the operations has been described in detail in the embodiments related to the method, and is not explained in detail herein.

In the embodiment of the present disclosure, an aircraft sends a Message3 for requesting an RRC connection to a base station, receives a Message4 sent by the base station to notify the aircraft that the RRC connection is successful, the Message4 carrying a no-fly zone range, and performs a stop-flight operation when the position of the aircraft is within the no-fly zone range. In this way, after an RRC connection is established between the aircraft and the base station, a no-fly zone range corresponding to the base station can be obtained, and then, whether the aircraft is within the no-fly zone range can be automatically determined, without subjective judgment by the person, thereby the accuracy of determining the no-fly zone range is improved.

Figure 9:
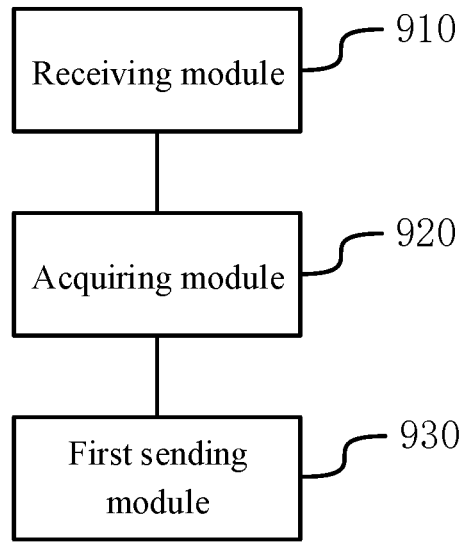
FIG. 9 is a schematic diagram of a flight control device according to an exemplary embodiment.

Yet another exemplary embodiment of the present disclosure provides a flight control device which may be a base station. The device as shown in FIG. 9 includes:

a receiving module 910 configured to receive a Message3 sent by an aircraft, wherein the Message3 is a message for requesting a radio resource control (RRC) connection, and the Message3 carries an aircraft identifier;

an acquiring module 920 configured to acquire a no-fly zone range corresponding to the base station in response to available resources of the base station meeting a transmission condition of the RRC connection requested by the Message3 and the Message3 carries the aircraft identifier; and a first sending module 930 configured to send a Message4 to the aircraft, wherein the Message4 carries the no-fly zone range and is used to notify the aircraft that the RRC connection is successful.

Optionally, the Message4 carries an RRC Connection Setup signaling, and the RRC Connection Setup signaling carries the no-fly zone range.

Figure 10:
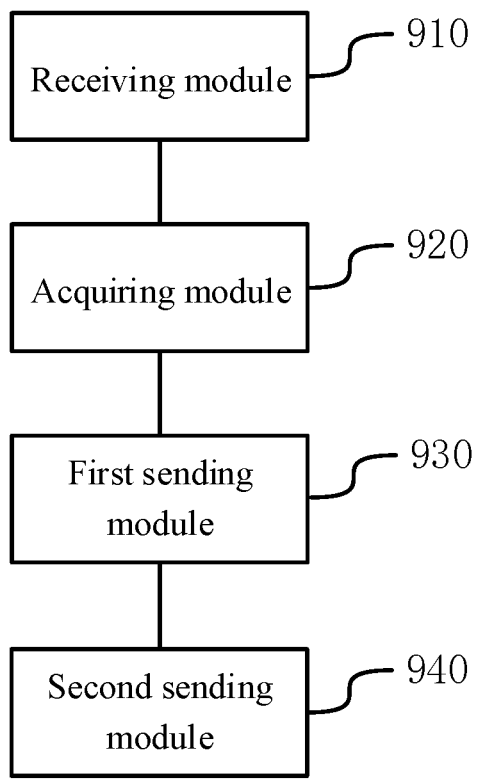
FIG. 10 is a schematic diagram of a flight control device according to an exemplary embodiment.

Optionally, as shown in FIG. 10, the device further includes:

a second sending module 940 configured to send an updated no-fly zone range to an aircraft currently accessing the base station when the no-fly zone range is updated.

Optionally, the second sending module 940 is configured to:

send an RRC Connection Reconfiguration signaling to the aircraft currently accessing the base station, wherein the RRC Connection Reconfiguration signaling carries the updated no-fly zone range; or send a media access control control element (MAC CE) signaling to the aircraft currently accessing the base station, wherein the MAC CE signaling carries the updated no-fly zone range.

Figure 11:
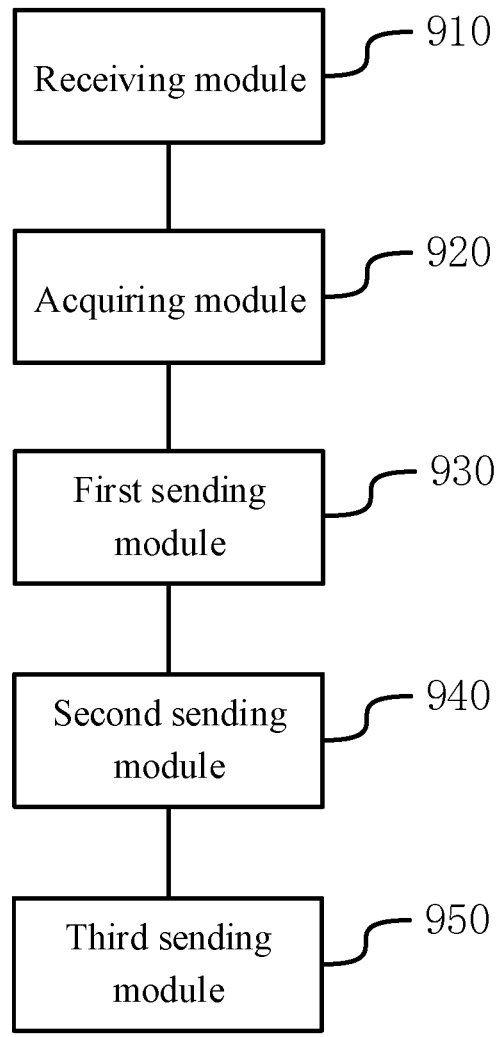
FIG. 11 is a schematic diagram of a flight control device according to an exemplary embodiment.

Optionally, as shown in FIG. 11, the device further includes:

a third sending module 950 configured to send a paging signaling to an aircraft that enters an IDLE state after accessing the base station when the no-fly zone range is updated.

In the embodiment of the present disclosure, a base station receives a Message3 sent by an aircraft for requesting an RRC connection, acquires a no-fly zone range corresponding to the base station and sends a message to the aircraft to notify the aircraft that the RRC connection is successful in response to available resources of the base station meeting a transmission condition of the RRC connection and the Message3 carries the aircraft identifier, the Message4 carrying the no-fly zone range. In this way, after an RRC connection is established between the aircraft and the base station, the base station can send a corresponding no-fly zone range to the aircraft, and then the aircraft can automatically determine whether it is within the no-fly zone based on the received no-fly zone range, without subjective judgment of the person, thus, the accuracy of determining the no-fly zone range is improved.

It should be noted that the flight control device provided by the above embodiments is only exemplified by the division of the above functional modules when controlling the flight of the aircraft. In actual applications, the functions may be realized by different functional modules according to needs. That is, the internal structure of the device is divided into different functional modules to complete all or part of the functions described above. In addition, the above embodiment for the flight control device and the embodiment for the flight control method belongs to the same conception, and the specific implementation process is described in detail in the method embodiment, and is not described herein again.

Yet another exemplary embodiment of the present disclosure provides a flight control system including an aircraft and a base station.

The aircraft is configured to: send a Message3 to the base station, wherein the Message3 is a message for requesting a radio resource control (RRC) connection, and the Message3 carries an aircraft identifier; receive a Message4 sent by the base station, wherein the Message4 is a message for notifying the aircraft that the RRC connection is successful, and the Message4 carries a no-fly zone range; and perform a stop-flight operation when the position of the aircraft is within the no-fly zone range.

The base station is configured to: receive a Message3 sent by an aircraft, wherein the Message3 is a message for requesting a radio resource control (RRC) connection, and the Message3 carries an aircraft identifier; acquire a no-fly zone range corresponding to the base station in response to available resources of the base station meeting a transmission condition of the RRC connection requested by the Message3 and the Message3 carries the aircraft identifier; and send a Message4 to the aircraft, wherein the Message4 carries the no-fly zone range and is used to notify the aircraft that the RRC connection is successful.

In the embodiment of the present disclosure, an aircraft sends a Message3 for requesting an RRC connection to a base station; after receiving the Message3 sent by the aircraft, the base station sends a Message4 carrying a corresponding no-fly zone range to the aircraft in response to available resources of the base station meeting a transmission condition of the RRC connection requested by the Message3 and the Message3 carries the aircraft identifier; and after receiving the Message4 carrying a no-fly zone range, the aircraft performs a stop-flight operation when the position of the aircraft is within the no-fly zone range. In this way, after an RRC connection is established between the aircraft and the base station, a no-fly zone range corresponding to the base station can be obtained, and then, whether the aircraft is within the no-fly zone range can be automatically determined, without subjective judgment by the person, thereby the accuracy of determining the no-fly zone range is improved.

Yet another exemplary embodiment of the present disclosure shows a schematic structural view of an aircraft. The aircraft may be a cellular network drone or the like.

Figure 12:
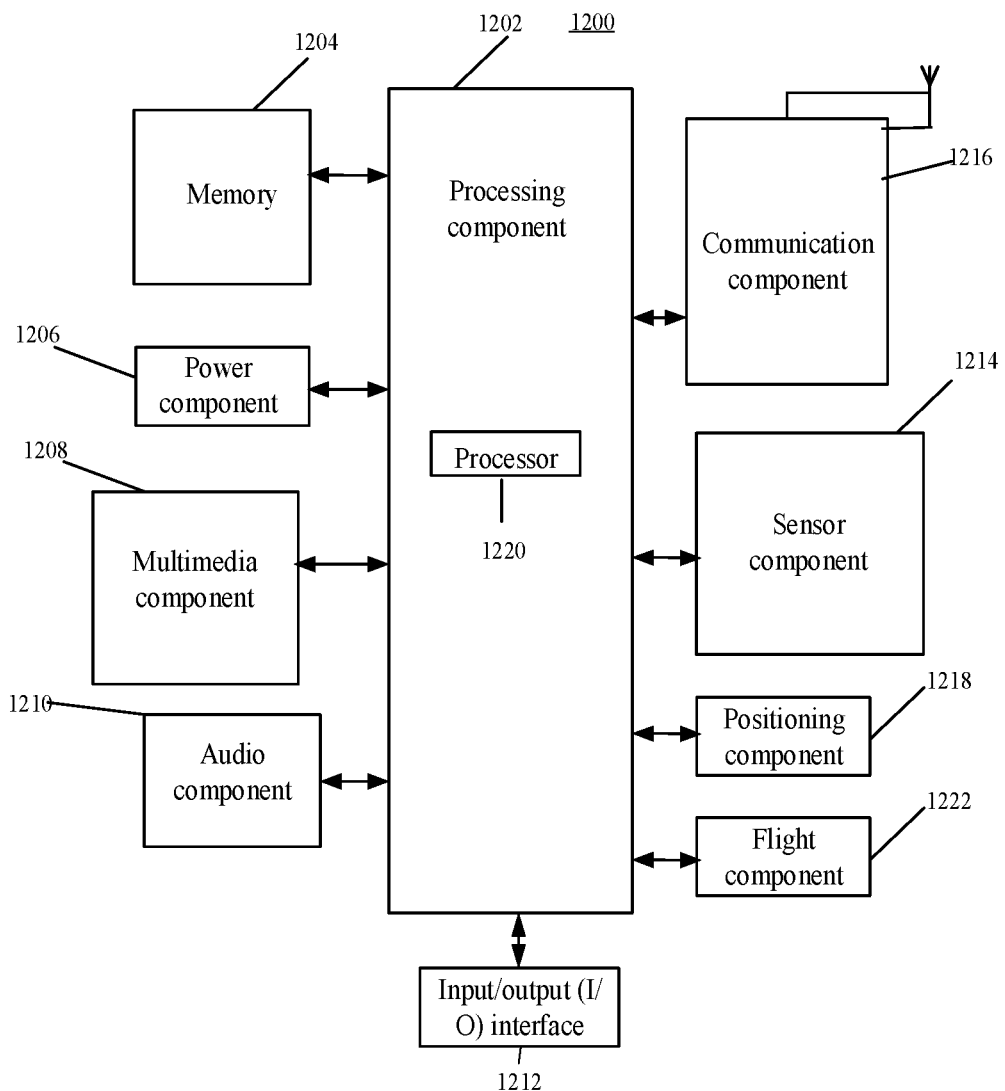
FIG. 12 is a schematic structural diagram of an aircraft according to an exemplary embodiment.

Referring to FIG. 12, an aircraft 1200 may include one or more of the following components: a processing component 1202, a memory 1204, a power component 1206, a multimedia component 1208, an audio component 1210, an input/output (I/O) interface 1212, a sensor component 1214, a communication component 1216, a positioning component 1218, and a flight component 1222.

The processing component 1202 typically controls the overall operation of the aircraft 1200, such as operations associated with display, telephone calls, data communications, camera operations, and recording operations. The processing component 1202 may include one or more processors 1220 to execute instructions to perform all or part of the steps of the above described methods. Moreover, the processing component 1202 may include one or more modules to facilitate interaction between the processing component 1202 and other components. For example, the processing component 1202 may include a multimedia module to facilitate interaction between the multimedia component 1208 and the processing component 1202.

The memory 1204 is configured to store various types of data to support operations of the aircraft 1200. Examples of the data include instructions for any application or method operating on the aircraft 1200, contact data, phone book data, messages, pictures, videos, and the like. The memory 1204 may be implemented by any type of volatile or non-volatile storage device or a combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Disk or Optical Disk.

The power component 1206 supplies power to various components of the aircraft 1200. The power component 1206 may include a power management system, one or more power sources, and other components associated with generating, managing, and distributing power for the aircraft 1200.

In some embodiments, the multimedia component 1208 includes a front camera and/or a rear camera. When the aircraft 1200 is in an operational mode, such as a shooting mode or a video mode, the front camera and/or the rear camera may receive external multimedia data. Each front and rear camera may be a fixed optical lens system or have focal length and optical zoom capabilities.

The audio component 1210 is configured to output and/or input an audio signal. For example, the audio component 1210 includes a microphone (MIC) that is configured to receive an external audio signal when the audio output device 1200 is in an operational mode, such as a call mode, a recording mode, and a voice recognition mode. The received audio signal may be further stored in the memory 1204 or transmitted via the communication component 1216.

The I/O interface 1212 provides an interface between the processing component 1202 and a peripheral interface module, which may be a keyboard, a click wheel, a button, or the like. These buttons may include, but are not limited to, a home button, a volume button, a start button, and a lock button.

The sensor component 1214 includes one or more sensors for providing a status assessment of various aspects to the aircraft 1200. For example, the sensor component 1214 may detect an ON/OFF state of the aircraft 1200, and relative positioning of components, which for example may be the display and keypad of the aircraft 1200. The sensor assembly 1214 may also detect changes in position of the aircraft 1200 or one component of the aircraft 1200, the presence or absence of contact by a user with the aircraft 1200, the orientation or acceleration/deceleration of the aircraft 1200 and the temperature change of the aircraft 1200. The sensor component 1214 may include a proximity sensor configured to detect the presence of nearby objects without any physical contact. The sensor assembly 1214 may also include a light sensor, such as a CMOS or CCD image sensor, for use in imaging applications. In some embodiments, the sensor component 1214 may also include an acceleration sensor, a gyro sensor, a magnetic sensor, a pressure sensor, or a temperature sensor.

The communication component 1216 is configured to facilitate wired or wireless communication between the aircraft 1200 and other devices. The aircraft 1200 may access a wireless network based on communication standards, such as Wi-Fi, 2G or 3G, or a combination thereof. In an exemplary embodiment, the communication component 1216 receives broadcast signals or broadcast associated information from an external broadcast management system via a broadcast channel. In an exemplary embodiment, the communication component 1216 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

The positioning component 1218 is configured to facilitate the determination of position coordinates by the aircraft 1200, which may be implemented using GPS or a Beidou satellite navigation system.

The flight component 1222 may include an electric motor, a propeller, or the like for providing flight power to the aircraft 1200.

In an exemplary embodiment, the aircraft 1200 may be implemented by one or more application specific integrated circuits (ASICs), digital signal processors (DSPs), digital signal processing devices (DSPDs), programmable logic devices (PLDs), Field Programmable Gate Array (FPGA), controller, microcontroller, microprocessor or other electronic component for performing the above methods.

In an exemplary embodiment, there is also provided a non-transitory computer readable storage medium storing instructions, such as a memory 1204 storing instructions executable by the processor 1220 of the aircraft 1200 to perform the above methods. For example, the non-transitory computer readable storage medium may be an ROM, a random access memory (RAM), a CD-ROM, a magnetic tape, a floppy disk, an optical data storage device and the like.

Yet another embodiment of the present disclosure provides a non-transitory computer readable storage medium that, when the instruction in the storage medium executed by a processor of an aircraft, enables the aircraft to:

send a Message3 to a base station, wherein the Message3 is a message for requesting a radio resource control (RRC) connection, and the Message3 carries an aircraft identifier;

receive a Message4 sent by the base station, wherein the Message4 carries a no-fly zone range, and is used to notify the aircraft that the RRC connection is successful; and perform a stop-flight operation when the position of the aircraft is within the no-fly zone range.

Optionally, the Message4 carries an RRC Connection Setup signaling, and the RRC Connection Setup signaling carries the no-fly zone range.

Optionally, performing a stop-flight operation includes:

landing the aircraft in response to the aircraft being in a flight state; and prohibiting takeoff of the aircraft in response to the aircraft being in a landed state.

Optionally, after receiving a Message4 sent by the base station, further includes:

receiving an updated no-fly zone range sent by the base station; and performing a stop-flight operation when the position of the aircraft is within the updated no-fly zone range.

Optionally, receiving an updated no-fly zone range sent by the base station includes:

receiving an RRC Connection Reconfiguration signaling sent by the base station, wherein the RRC Connection Reconfiguration signaling carries the updated no-fly zone range; or receiving a media access control control element (MAC CE) signaling sent by the base station, wherein the MAC CE signaling carries the updated no-fly zone range.

In the embodiment of the present disclosure, an aircraft sends a Message3 for requesting an RRC connection to a base station, receives a Message4 sent by the base station to notify the aircraft that the RRC connection is successful, the Message4 carrying a no-fly zone range, and performs a stop-flight operation when the position of the aircraft is within the no-fly zone range. In this way, after an RRC connection is established between the aircraft and the base station, a no-fly zone range corresponding to the base station can be obtained, and then, whether the aircraft is within the no-fly zone range can be automatically determined, without subjective judgment by the person, thereby the accuracy of determining the no-fly zone range is improved.

Yet another exemplary embodiment of the present disclosure shows a schematic structural diagram of a base station.

Figure 13:
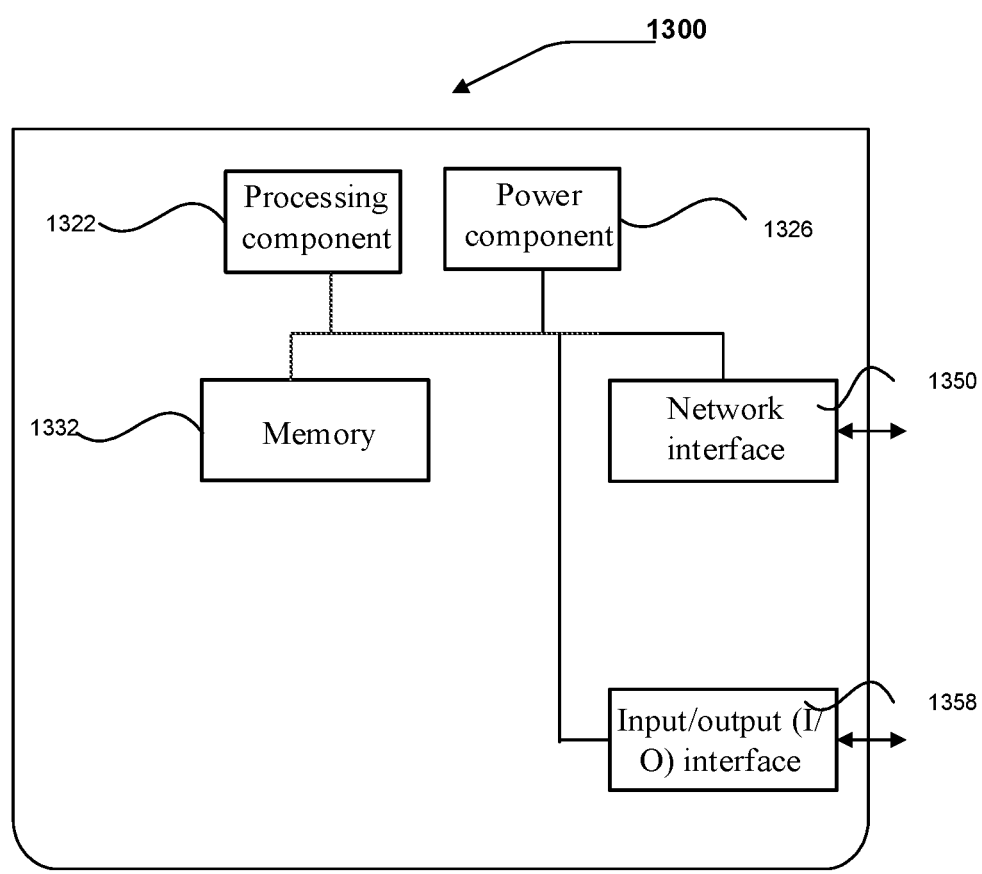
FIG. 13 is a schematic structural diagram of a base station according to an exemplary embodiment.

Referring to FIG. 13, a base station 1300 includes a processing component 1322 that further includes one or more processors, and memory resources represented by a memory 1332 for storing instructions executable by the processing component 1322, such as an application. An application stored in the memory 1332 may include one or each of more than one module corresponding to a set of instructions. Further, the processing component 1322 is configured to execute instructions to perform the above flight control method.

The base station 1300 may also include a power component 1326 configured to perform power management of the base station 1300, a wired or wireless network interface 1350 configured to connect the base station 1300 to a network, and an input/output (I/O) interface 1358.

The base station 1300 may include a memory, and one or more than one program. The one or more than one program is stored in the memory and configured to be executed by one or more than one processor to include instructions for performing the flight control method.

Yet another embodiment of the present disclosure provides a non-transitory computer readable storage medium that, when the instruction in the storage medium executed by a processor of a base station, enables the base station to:

receive a Message3 sent by an aircraft, wherein the Message3 is a message for requesting a radio resource control (RRC) connection, and the Message3 carries an aircraft identifier;

acquire a no-fly zone range corresponding to the base station in response to available resources of the base station meeting a transmission condition of the RRC connection requested by the Message3 and the Message3 carries the aircraft identifier; and send a Message4 to the aircraft, wherein the Message4 carries the no-fly zone range and is used to notify the aircraft that the RRC connection is successful.

Optionally, the Message4 carries an RRC Connection Setup signaling, and the RRC Connection Setup signaling carries the no-fly zone range.

Optionally, the method further includes:

sending an updated no-fly zone range to an aircraft currently accessing the base station when the no-fly zone range is updated.

Optionally, sending an updated no-fly zone range to the aircraft includes:

sending an RRC Connection Reconfiguration signaling to the aircraft currently accessing the base station, wherein the RRC Connection Reconfiguration signaling carries the updated no-fly zone range; or sending a media access control control element (MAC CE) signaling to the aircraft currently accessing the base station, wherein the MAC CE signaling carries the updated no-fly zone range.

Optionally, the method further includes:

sending a paging signaling to an aircraft that enters an IDLE state after accessing the base station when the no-fly zone range is updated.

In the embodiment of the present disclosure, a base station receives a Message3 sent by an aircraft for requesting an RRC connection, acquires a no-fly zone range corresponding to the base station and sends a Message4 to the aircraft for notifying the aircraft that the RRC connection is successful in response to available resources of the base station meeting a transmission condition of the RRC connection and the Message3 carries the aircraft identifier, the Message4 being a message for notifying the aircraft that the RRC connection is successful and the Message4 carrying the no-fly zone range. In this way, after an RRC connection is established between the aircraft and the base station, the base station can send a corresponding no-fly zone range to the aircraft, and then the aircraft can automatically determine whether it is within the no-fly zone based on the received no-fly zone range, without subjective judgment of the person, thus, the accuracy of determining the no-fly zone range is improved.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A flight control method, performed by an aircraft, the method comprising:

sending a random access preamble to a base station;

sending a first message to the base station in response to receiving a random access response (RAR) message sent by the base station according to the random access preamble, wherein the first message is a message for requesting a radio resource control (RRC) connection, and the first message carries an aircraft identifier, wherein the aircraft identifier is configured to notify the base station that a type of a terminal requesting the RRC connection is an aircraft type;

receiving a second message sent by the base station according to the first message, wherein the second message is a message for notifying the aircraft that the RRC connection is successful, and the second message carries a no-fly zone range; and performing a stop-flight operation when determining that a position of the aircraft is within the no-fly zone range.

2. The flight control method of claim 1, wherein the second message carries an RRC Connection Setup signaling, and the RRC Connection Setup signaling carries the no-fly zone range.

3. The flight control method of claim 1, wherein performing a stop-flight operation comprises:

landing the aircraft in response to the aircraft being in a flight state; and prohibiting takeoff of the aircraft in response to the aircraft being in a landed state.

4. The flight control method of claim 1, wherein after receiving a second message sent by the base station, the method further comprises:

receiving an updated no-fly zone range sent by the base station; and performing a stop-flight operation when determining that the position of the aircraft is within the updated no-fly zone range.

5. The flight control method of claim 4, wherein receiving an updated no-fly zone range sent by the base station comprises:

receiving an RRC Connection Reconfiguration signaling sent by the base station, wherein the RRC Connection Reconfiguration signaling carries the updated no-fly zone range; or receiving a media access control control element (MAC CE) signaling sent by the base station, wherein the MAC CE signaling carries the updated no-fly zone range.

6. A flight control method, performed by a base station, the flight control method comprising:
receiving a random access preamble sent by an aircraft;
sending a random access response (RAR) message to the aircraft according to the random access preamble;
receiving a first message sent by the aircraft according to the RAR message, wherein the first message is a message for requesting a radio resource control (RRC) connection, and the first message carries an aircraft identifier, wherein the aircraft identifier is configured to notify the base station that a type of a terminal requesting the RRC connection is an aircraft type;
acquiring a no-fly zone range corresponding to the base station in response to available resources of the base station meeting a transmission condition of the RRC connection requested by the first message and the first message carries the aircraft identifier; and
sending a second message to the aircraft, wherein the second message carries the no-fly, zone range and is used to notify the aircraft that the RRC connection is successful.

7. The flight control method of claim 6, wherein the second message carries an RRC Connection Setup signaling, and the RRC Connection Setup signaling carries the no-fly zone range.

8. The flight control method of claim 6, further comprising:
sending an updated no-fly zone range to the aircraft when determining that the no-fly zone range is updated.

9. The flight control method of claim 8, wherein sending an updated no-fly zone range to the aircraft comprises:
sending an RRC Connection Reconfiguration signaling to the aircraft currently accessing the base station, wherein the RRC Connection Reconfiguration signaling carries the updated no-fly zone range; or
sending a media access control control element (MAC CE) signaling to the aircraft currently accessing the base station, wherein the MAC CE signaling carries the updated no-fly zone range.

10. The flight control method of claim 8, further comprising:
sending a paging signaling to an aircraft that enters an IDLE state after accessing the base station when determining that the no-fly zone range is updated.

11. A flight control device, wherein the flight control device is an aircraft comprising:
one or more processors; and
a tangible non-transitory computer-readable storage medium configured to store a plurality of instructions executable by the one or more processors,
wherein the one or more processors are configured to:
send a random access preamble to a base station;
send a first message to the base station in response to receiving a random access response (RAR) message sent by the base station according: to the random access preamble, wherein the first message is a message for requesting a radio resource control (RRC) connection, and the first message carries an aircraft identifier, wherein the aircraft identifier is configured to notify the base station that a type of a terminal requesting the RRC connection is an aircraft type;

receive a second message sent by the base station, wherein the second message is a message for notifying the aircraft that the RRC connection is successful, and the second message carries a no-fly zone range; and
perform a stop-flight operation when determining that the position of the aircraft is within the no-fly zone range.

12. The flight control device of claim 11, wherein the second message carries an RRC Connection Setup signaling, and the RRC Connection Setup signaling carries the no-fly zone range.

13. The flight control device of claim 11, wherein the performing a stop-flight operation comprises:
land the aircraft in response to the aircraft being in a flight state; and
prohibit takeoff of the aircraft in response to the aircraft being in a landed state.

14. The flight control device of claim 11, wherein the one or more processors are further configured to:
receive an updated no-fly zone range sent by the base station; and
perform a stop-flight operation when determining that the position of the aircraft is within the updated no-fly zone range.

15. The flight control device of claim 14, wherein the receiving an updated no-fly zone range sent by the base station comprises:
receive an RRC Connection Reconfiguration signaling sent by the base station, wherein the RRC Connection Reconfiguration signaling carries the updated no-fly zone range; or
receive a media access control control element (MAC CE) signaling sent by the base station, wherein the MAC CE signaling carries the updated no-fly zone range.

16. A flight control system, wherein the flight control system is a base station comprising:
one or more processors; and
a tangible non-transitory computer-readable storage medium configured to store a plurality of instructions executable by the one or more processors,
wherein the processors are configured to:
receive a random access preamble sent by an aircraft;
send a random access response (RAR) message to the aircraft according to the random access preamble;
receive a first message sent by the aircraft according to the RAR message, wherein the first message is a message for requesting a radio resource control (RRC) connection, and the first message carries an aircraft identifier, wherein the aircraft identifier is configured to notify the base station that a type of a terminal requesting the RRC connection is an aircraft type;
acquire a no-fly zone range corresponding to the base station in response to available resources of the base station meeting a transmission condition of the RRC connection requested by the first message and the first message carries the aircraft identifier; and
send a second message to the aircraft, wherein the second message carries the no-fly zone range and is used to notify the aircraft that the RRC connection is successful.

17. The flight control system of claim 16, wherein the second message carries an RRC Connection Setup signaling, and the RRC Connection Setup signaling carries the no-fly zone range.

18. The flight control system of claim 16, wherein the processors are further configured to:
 send an updated no-fly zone range to the aircraft when determining that the no-fly zone range is updated.

19. The flight control system of claim 18, wherein the sending an updated no-fly zone range to the aircraft comprises:
 sending an RRC Connection Reconfiguration signaling to the aircraft currently accessing the base station, wherein the RRC Connection Reconfiguration signaling carries the updated no-fly zone range; or
 sending a media access control control element (MAC GE) signaling to the aircraft currently accessing the base station, wherein the MAC CE signaling carries the updated no-fly, zone range.

20. The flight control system of claim 18, wherein the processors are further configured to:
 send a paging signaling to an aircraft that enters an IDLE state after accessing the base station when determining that the no-fly zone range is updated.

* * * * *